United States Patent [19]
Frank

[11] Patent Number: 5,532,470
[45] Date of Patent: Jul. 2, 1996

[54] OPTICAL ENCODING AND READOUT SYSTEM USING A LIQUID CRYSTAL MODULATOR TO ENCODE LIGHT WITH AN OBJECT'S IDENTIFICATION CODE AND RELATED SENSOR DATA

[75] Inventor: David A. Frank, Tuczon, Ariz.

[73] Assignee: Hughes Aircraft Company, Los Angeles, Calif.

[21] Appl. No.: 325,000

[22] Filed: Oct. 18, 1994

[51] Int. Cl.$^6$ .................................................. G06K 19/06
[52] U.S. Cl. ........................................... 235/491; 235/454
[58] Field of Search .................................. 235/454, 491, 235/492

[56] References Cited

U.S. PATENT DOCUMENTS

| | | | |
|---|---|---|---|
| 4,403,869 | 9/1983 | Crutcher | 368/10 |
| 4,853,524 | 8/1989 | Yamaguchi et al. | 235/491 X |
| 4,916,296 | 4/1990 | Streck | 235/491 X |
| 4,978,840 | 12/1990 | Anegawa | 235/491 X |
| 5,091,636 | 2/1992 | Takada et al. | 235/454 |
| 5,237,164 | 8/1993 | Takada | 235/487 |
| 5,410,147 | 4/1995 | Riza et al. | 250/214 LS |

FOREIGN PATENT DOCUMENTS

| | | | |
|---|---|---|---|
| 0546797 | 6/1993 | European Pat. Off. | 235/462 |
| 0015479 | 1/1988 | Japan | 235/491 |
| 0062789 | 3/1989 | Japan | 235/491 |
| 0108184 | 4/1990 | Japan | 235/491 |
| 0341414 | 2/1991 | Japan | 235/491 |
| 0105589 | 5/1991 | Japan | 235/491 |

OTHER PUBLICATIONS

Marshall, "The Computer Comes to the Supermarket", *Optic News*, Jan. 1976, pp. 5–9.

Schneiderman, "RFID Tags Locate Growing Wireless Market", *Microwaves & RF*, Feb. 1994, pp. 31–36.

International Sensor Technology, 1992 Condensed Product Catalog.

*Primary Examiner*—Donald T. Hajec
*Assistant Examiner*—Steven Wigmore
*Attorney, Agent, or Firm*—V. D. Duraiswamy; W. K. Denson-Low

[57] ABSTRACT

An optical data encoding and readout system for identifying an object and providing sensor data related to the condition of the object includes a liquid crystal cell for receiving a polarized readout beam. A control circuit reads identification and sensor data codes stored in a predetermined format in memory, and modulates the liquid crystal cell in accordance with the codes which in turn modulates the polarization of the readout beam.

14 Claims, 3 Drawing Sheets

FIG. 1.
(PRIOR ART)
FIG. 2.
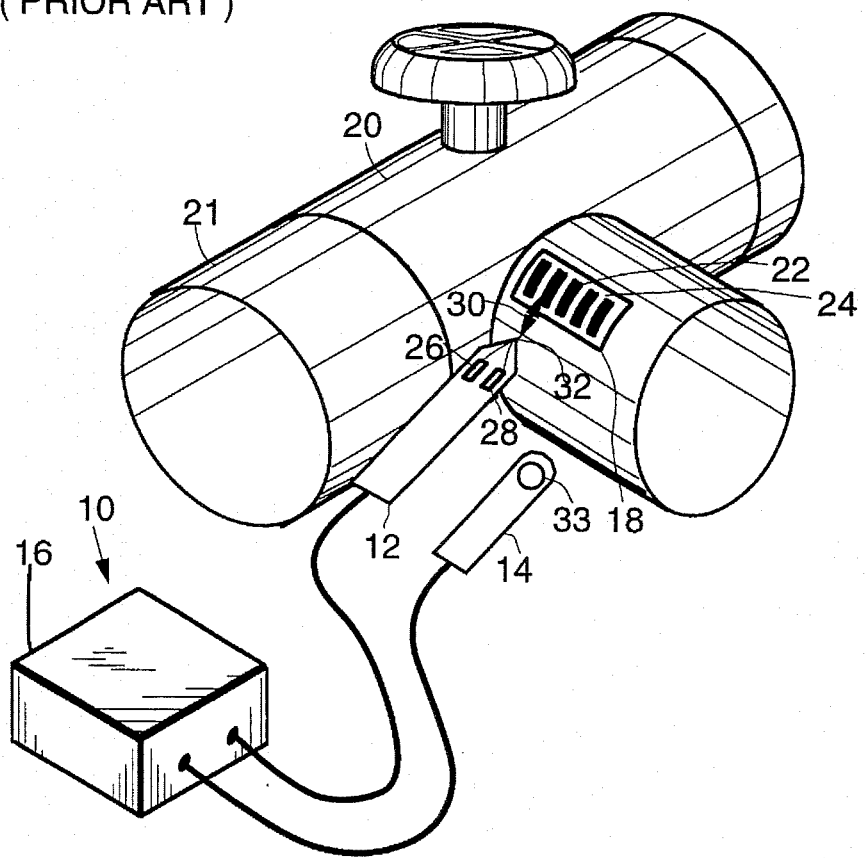
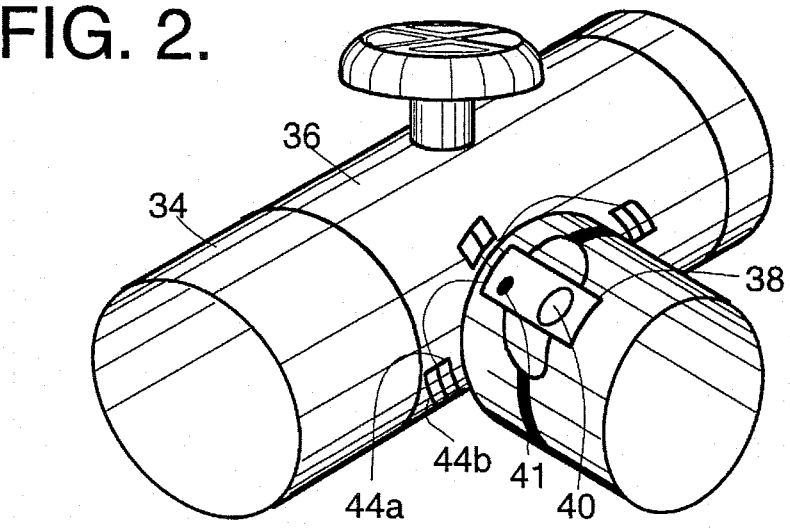

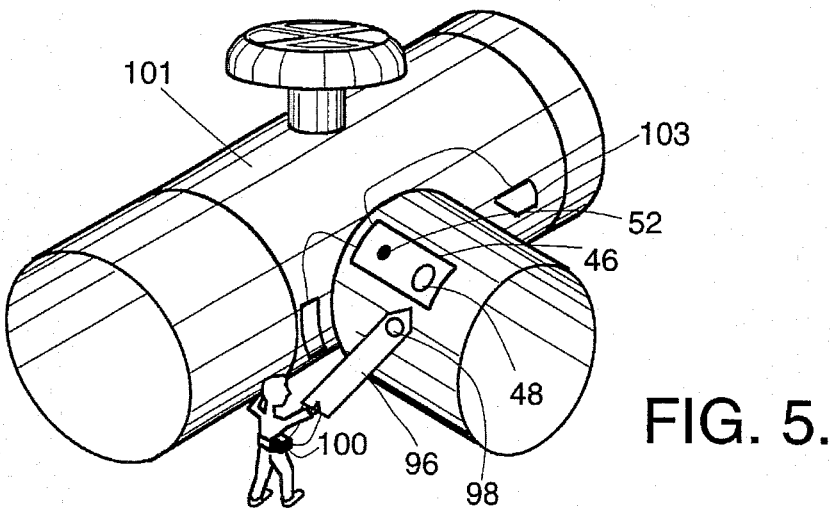
FIG. 5.
FIG. 6.
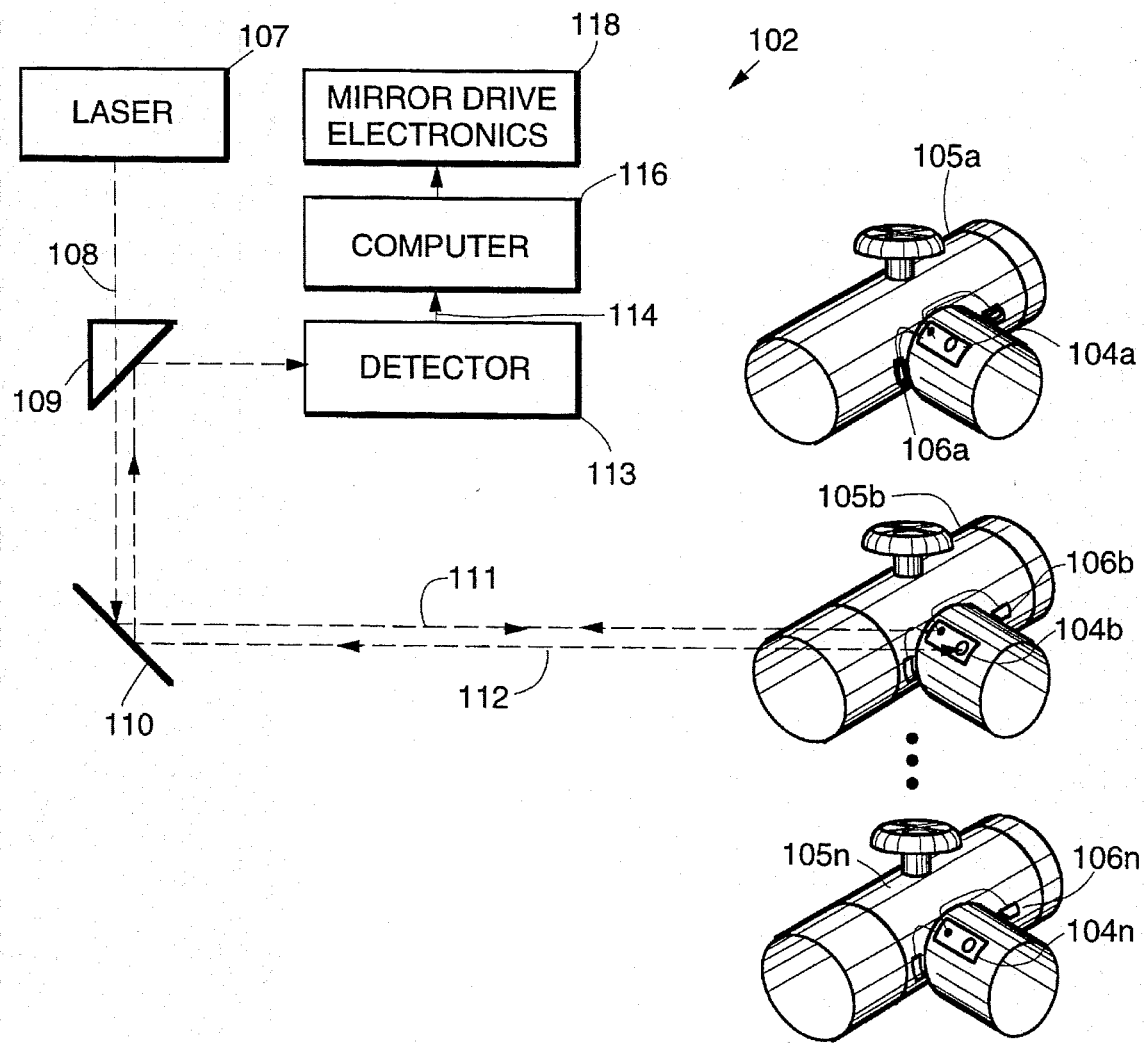

OPTICAL ENCODING AND READOUT SYSTEM USING A LIQUID CRYSTAL MODULATOR TO ENCODE LIGHT WITH AN OBJECT'S IDENTIFICATION CODE AND RELATED SENSOR DATA

BACKGROUND OF THE INVENTION

1. Field of the Invention

The present invention generally relates to the field of data encoding and scanning systems, and more specifically to an optical scanning system using a liquid crystal modulator to encode an object identification code and related sensor data.

2. Description of the Related Art

Data acquisition systems commonly use printed bar codes to identify objects for the purpose of keeping inventory, tracking manufacturing processes, and acquiring data. For example, oil refineries identify thousands of valves by unique bar codes and gather sensor data for each valve, and grocery stores use bar codes to identify prices and continually update inventories. A wand reader for scanning bar codes to identify products is disclosed in Marshall, "The Computer Comes to the Supermarket", *OPTICS NEWS*, January 1976, pp. 5–9.

A bar code is a series of black and white parallel bars of varying widths imprinted on a piece of paper, and formatted to represent a binary code that can be detected optically by reflecting light off the bar code and detecting the intensity pattern of the reflected light. There are many different bar code formats of which the UPC code found in grocery stores is the most widely known. A bar code includes several alphanumeric characters with each character being represented by a fixed number of black and white bars and having a predetermined total width. To prevent and identify scanning errors, the bar code format incorporates error correction codes, and includes known patterns at both ends to identify the beginning and ending of a bar code, and between the individual characters. Additionally, each alphanumeric character is printed on the bar code in case the wand won't read the code, and then it has to be entered manually.

One specific example of a bar code is code 39 that includes a total of 9 bars for each character of which 3 are wide bars and 6 are narrow bars, and an intercharacter space for separating adjacent characters. In the following examples, the wide bars have a width of 3 units which corresponds to 3 bits, the narrow bars have a width of 1 unit, and the space has a width of 2 units such that each character is represented by a total of 17 bits. The format also specifies that the first and fifteenth bits always correspond to black bars, and the last two bits (the space) correspond to white spaces. The identification codes are three characters long, and each character has 36 possibilities; letters A–Z and numbers 0–9, which provides $36^3=46,565$ possible ID codes.

FIG. 1 is a diagram of a data acquisition system using a wand reader to scan bar codes and a portable sensor to gather data. In this particular example, several thousand valves are dispersed throughout an oil refinery and imprinted with bar codes to identify the valve. A technician scans the bar code for each valve to record its identification code, and uses a "sniffer" to sense and record the level of volatile organic compounds (VOC) leaking out of the valve.

A data acquisition unit 10 includes a wand reader 12 and a sniffer 14 electrically connected to a portable computer 16. A bar code 18 is affixed to a valve 20 which controls the flow of oil through pipes 21, and includes a sequence of parallel black and white bars 22 and 24 formatted in accordance with code 39 to identify the valve. The black and white portions of the code alternately absorb and reflect light. In reality, the bar codes are not pure black and white but rather grey tones, which reduces the reflected light's contrast ratio to approximately 3:1.

The wand reader includes a light emitting diode (LED) source 26 and a phototransistor detector 28. The bar code is detected by placing the wand on one end of the bar code, and scanning across the code. The LED emits a beam of light 30 through an opening 32 in the wand, and the bar code modulatse the beam between binary intensity levels, and reflects it back through the opening to the detector which converts the low-power light into a relatively high-level electronic signal that varies in proportion to the light's intensity. The electronic signal is transmitted to the computer and is routed through logic circuitry to identify the codeword.

The computer checks the codeword's validity, and if an error occurs, the code is rescanned or entered manually. Starting the wand in the wrong place, not maintaining good contact between the wand and the code, not finishing the code, etc. may cause detection errors. Furthermore, the software used to decode the modulated light must compensate for variations in scanning rate and the limited contrast ratio of the modulated signal.

After the bar code is correctly detected, the technician uses the sniffer which includes a VOC sensor 33 to sense and record the level of hydrocarbons emitted from the valve. The sensed data is digitized and stored in the portable computer.

For applications such as the oil refinery, a data acquisition system that requires technicians to use a wand reader to scan bar codes and a separate sensor to gather data is too restrictive. It is a labor and time intensive process prone to detection errors. Systems that attempt to detect bar codes automatically from a distance have other deficiencies. It is difficult to focus the light source, typically a laser beam, to a small enough point on the bar code to ensure that the light is encoded correctly. If the beam is too wide, it will simultaneously read more than one bit of the bar code. Additionally, as the length of the optical path increases, it becomes more difficult to control the path to ensure that the light is reflected back to the detector. Small variations can cause the light to completely miss the detector. Furthermore, the light reflected from the bar code is scattered. Thus as the detector moves farther away from the bar code, the perceived contrast ratio between the intensity levels diminishes to a point at which detection is very difficult. Constantly adjusting the laser beam's intensity to maintain adequate contrast is not feasible because of the power requirements and the safety hazards. If a constant beam intensity is used, very large and expensive optical lenses are required to gather enough reflected light to maintain a sufficient contrast level for detection. Another drawback is that these systems are limited to the specific task of reading bar codes. Applications that output data obtained from sensing characteristics of the object to which the bar code is attached, in addition to reading the bar code itself, require a separate system for the sensing function.

An alternative to bar codes for identifying objects is discussed in Schneiderman, "RFID Tags Locate Growing Wireless Market", *Microwaves & RF*, February 1994, pp. 31–36. A radio frequency (RF) transponder is programmed with the desired identification information and attached to an object. When a source illuminates the object with an RF signal, the transponder transmits an RF signal with the stored information. This system does not encode and transmit sensory data about the object, and the transmission of RF signals poses questions concerning health and safety.

The Wireless Remote Link System disclosed in the 1992 "Condensed Product Catalog" for International Sensor Technology monitors toxic and combustible gases. The principal means of communication, as well as power, is the AC power lines which are connected to a central computer. This approach avoids external scanners or RF transmission, but requires AC power lines for each unit.

SUMMARY OF THE INVENTION

The present invention seeks to provide an optical data encoding and readout system for identifying an object, and more specifically a system that simplifies data acquisition, reduces scanning errors, allows more efficient code formats, combines object identification and data acquisition, simplifies detection, and provides an efficient and automated long range scanner.

An optical data encoding and readout system for identifying an object includes a liquid crystal cell for receiving a polarized readout beam. A control circuit reads an identification code and sensor data codes stored in a predetermined format in memory, and modulates the liquid crystal cell in accordance with the codes which in turn modulates the polarization of the readout beam.

In another embodiment, a long range data encoding and scanning system for identifying a plurality of objects includes a directable light source for projecting a polarized readout beam, an encoding unit attached to each object for modulating the readout beam in accordance with identification and data codes, and a detector for decoding the modulated beam. Each unit includes a liquid crystal cell for receiving the readout beam, and a control circuit for reading out the object identification code and sensor data codes from a memory and modulating the liquid crystal cell in accordance with the codes.

DESCRIPTION OF THE DRAWINGS

For a better understanding of the invention, and to show how the same may be carried into effect, reference will now be made, by way of example, to the accompanying drawings in which:

FIG. 1 is a diagram of a conventional scanning system using a wand reader to scan printed bar codes;

FIG. 2 is a diagram of an embodiment of the invention for monitoring the condition of a valve in an oil refinery;

FIG. 5 is a diagram of a data acquisition system using a wand reader to scan the liquid crystal modulator shown in FIG. 3; and FIG. 6 is a diagram of a long range data acquisition system that scans a plurality of liquid crystal modulators like the one shown in FIG. 3.

DETAILED DESCRIPTION OF THE INVENTION

Figure 3:
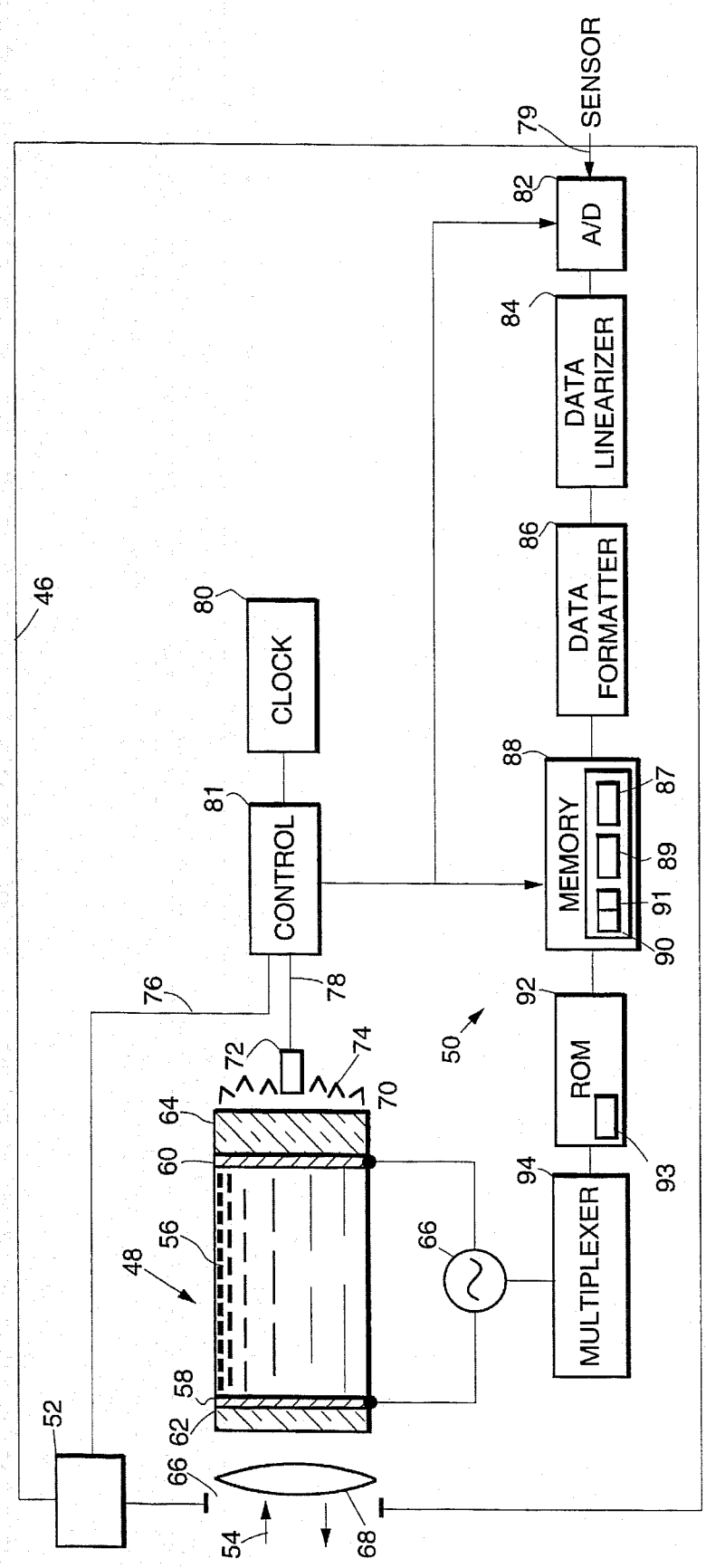
FIG. 3 is a block diagram of an embodiment of the invention that uses a liquid crystal modulator to simulate bar codes.

In the present invention, the object identification codes and gathered sensor data for the object are stored in an electronic memory in a format corresponding to a bar code, specifically code 39. A control circuit reads the codes out of memory, and modulates a liquid crystal cell which in turn modulates a readout beam. The result is that the modulation of the readout beam is similar to that achieved by manually scanning a bar code, and thus bar code wand readers and acquisitions systems can be used in conjunction with the invention. However, the invention is not limited to bar code formats, and because many of the physical limitations are removed by the invention, simpler and more efficient code formats can be used for the ID and data codes.

FIG. 2 is a diagram of a portion of an refinery in which the flow of oil or natural gas through pipelines 34 is controlled by a valve 36. It is important to monitor the condition of the valves to schedule maintenance and replace the valves prior to failure to reduce cost and improve safety. A data encoding unit 38 approximately 3 by 5 inches in size is strapped to valve 36, and includes a liquid crystal modulator 40 for modulating a light signal, a push-button switch 41, a light sensitive switch disposed behind the liquid, and a modulation circuit. The encoding unit is electrically connected to eight pairs of sensors 44a and 44b that measure the valve's temperature and leaking hydrocarbon levels at eight critical joints in the valve. The measured sensor data and an identification code are stored electronically in a format compatible with bar code format 39.

The data encoding unit can be used in conjunction with a portable wand reader (FIG. 5) or a long-range scanner (FIG. 6). Each system projects a polarized readout beam, and detects and decodes the readout beam modulated by the liquid crystal. When using the wand reader, data acquisition is initiated by holding the wand up to the LCD and pushing button 41. The beam emitted by the wand is very narrow, and it would be difficult to illuminate the light sensor 42 as well as the liquid crystal. In the long range scanner, the readout beam is much wider, and activates the light sensitive switch to initiate encoding. The liquid crystal 40 receives the readout beam, and the modulation circuit reads the stored identification and data codes, and modulates the liquid crystals in accordance with the codes which in turn modulates the readout beam.

FIG. 3 is a block diagram of the data encoding unit shown in FIG. 2. The encoding unit 46 includes a liquid crystal modulator 48, a modulation circuit 50 and a push button switch 52, and modulates a polarized readout beam 54. A complete description of a liquid crystal modulator can be found in Wu, "Nematic liquid crystal modulator with response time less than 100 us at room temperature" *Applied Physics Letters*, Vol 57, No 10, pp. 986–988, Sep. 3 1990.

The liquid crystal modulator includes a liquid crystal cell 56 with transparent electrodes 58, 60 disposed on its opposite ends for applying a uniform voltage across the cell, and glass windows 62, 64 covering the electrodes to protect the cell. A controllable voltage source 66 is applied across the electrodes, and alternates between on and off positions corresponding to a 10 khz signal and no signal respectively.

The voltage source modulates the liquid crystals between on and off orientations, which in turn modulate the beam's polarization. The liquid crystals are "on" when they are rotated a full ninety degrees to be perpendicular with the beam, and are "off" when they are unrotated and parallel with the beam. When the liquid crystal is off, the polarization of the beam is not changed, and when the liquid crystal is on, the beam's polarization is modulated by forty-five degrees.

The liquid crystal modulator is disposed behind a window 66 in the encoding unit, and between a lens 68 which focuses the readout beam onto the back surface of the liquid crystal, and a reflector array 70 which reflects the readout beam back through the liquid crystal. Because the beam passes through the liquid crystal twice, the polarization modulated beam has either the same polarization or a polarization that is rotated ninety degrees from the readout beam. A light sensor 72 is positioned in the center of the array for detecting the readout beam for the long range scanner, and initiating modulation of the liquid crystals.

Ideally the incident readout beam would be perpendicular to the liquid crystal, and a planar mirror could be used to reflect the readout beam back to the detector. In the wand reader implementation, the wand is modified to include a polarizer, and is held up to the liquid crystal such that the optical path is very short, and thus small deviations in the angle of the reflected readout beam are not critical. In the long range scanning system, the source of the readout beam and the detector may be several hundred feet from the encoding unit, and small deviations in the readout beam's path reduce the contrast ratio of the detected signal, and may result in a system failure.

For the reflected beam to be detected with a sufficient contrast ratio, the optical path between the source of the readout beam and the detector must be tightly controlled. Therefore, the reflector array is a two-dimensional array of corner reflectors 74 which are comprised of three mutually perpendicular reflective surfaces, i.e. a corner, such that the readout beam is reflected on a path parallel to the incident path with a small offset. The size of the offset is determined by how far the incident path is from the corner of the reflector. The LCD has a two inch diameter, and the reflector array contains approximately 300 individual corner reflectors. The corner reflector array and the liquid crystal provide a high contrast and relatively large active area which make remote optical encoding and detection practical.

Figure 4:
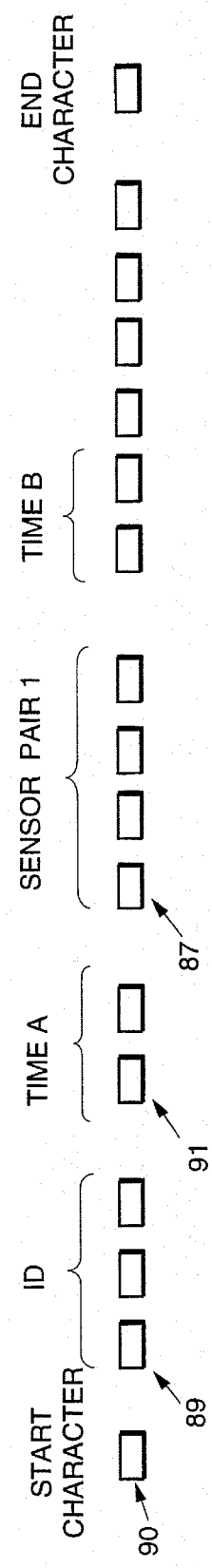
FIG. 4 is a diagram of a formatted data sequence used in the embodiment of the invention.

The modulation circuit 50 receives an initiation signal 76 or 78 from the mechanical or optical switches respectively depending upon the application and sensor data 79 from the hydrocarbon and temperature sensors, and modulates the voltage source 66 to activate the liquid crystal cells, which in turn modulate the readout beam. The initiation signal, and a clock signal 80 are input to a control switch 81 that sends a signal to read the current sensor levels at predetermined time intervals and in response to the initiation signals. The acquired sensor data is digitized by a 21 bit A/D converter 82, and processed by a linearizing circuit 84 which compensates for the non-linear response of the hydrocarbon sensors. The linear digitized data is sent to a data formatter 86 that maps each 21 digit binary codeword into a 2 digit data codeword 87 in which each digit is selected from 36 possible characters (A–Z,0–9). The first character is selected by the 6 most significant bits (msbs), and the second character is selected by the next 6 bits in the 21 bit codeword. The time that the data was acquired from the sensors is recorded and formatted into a 2 digit 36 character codeword 91. The character formatted sensor and time data is stored in a memory 88. In addition to the sensor data, each encoding unit is identified by a unique 3 digit, 36 character codeword ID code 89 which is stored in memory. FIG. 4 shows a data sequence 90, in which the first character is a known start character and is followed by the ID code 89, the most recent time code 91 and the 16 data codewords 87 (8 pairs of sensors), and the next most recent set of data, and so forth with the last character being a known end character.

Data sequence 90 is sequentially read out of memory 88 a character at a time, and is provided to a ROM (Read Only Memory) 92 which stores a binary code 93 in a bar code format (code 39) for each character. As described previously, codes stored electronically in accordance with code 39 consume 17 total bits: 6 bits for the 6 narrow bars, 9 bits for the 3 wide bars, and 2 bits for the intercharacter space. However, the first and last three bits never change, and thus only thirteen bit codes are stored in the ROM. The ROM outputs the thirteen bit code corresponding to the input character to a multiplexer 94 which sequentially outputs each of the 17 bits of the complete code to the voltage source 66. A 1 bit corresponding to a light space has a low output voltage, and 0 bit corresponding to a dark bar has a high output voltage.

The voltage source responds to the high output, and applies a 10 khz signal across the liquid crystal cell which rotates the liquid crystals and modulates the polarization of the readout beam by forty-five degrees. The voltage source applies no signal to the liquid crystal in response to the low output. The liquid crystal can be modulated at approximately 300 hz which corresponds to about 20 characters per second.

The encoding unit as described can be used with both the wand reader and long range scanners. If the units are to be used only in conjunction with a conventional wand reader, the array of corner reflectors can be replaced by a single planar reflector, and a polarizer can be included in front of the liquid crystal. If the application is exclusively long range scanning, the array of corner reflectors can be replaced by a single corner reflector. The array of corner reflectors is used to provide the control of the optical path required by long range scanning, and the small offset required by the wand reader.

FIG. 5 shows a data acquisition system using a modified wand reader 96 and the encoding unit 46 described in FIG. 3. The unit is attached to a valve 101 and receives data from temperature and hydrocarbon sensors 103. The wand reader is modified to include a polarizer 98 in the optical path of the readout beam. A technician holds the wand which is attached to a portable computer 100 up to the liquid crystal modulator 48, and pushes the button 52. The wand emits a polarized readout beam which is modulated to encode the unit's ID code and the sensor data. The polarization modulated beam re-enters the wand and is transmitted through the polarizer which modulates it's intensity in accordance with the ID code and sensor codes. Bit values of 1 which are defined to correspond to white spaces in a bar code do not change the polarization of the readout beam, and thus the beam passes through the polarizer and is detected with a high intensity level. Conversely, 0 bit values corresponding to dark bars modulate the polarization of the beam by ninety degrees, and are blocked by the polarizer, and detected with a low intensity level.

The wand produces an electrical signal proportional to the modulated optical signal, and sends the signal to computer 100 which converts it to a logic signal representing the detected codeword. The computer identifies the ID code and logs the sensor data for that code. If a detection error should occur, the wand beeps, and the technician rescans the modulator.

The detected intensity pattern is similar to using a wand reader to scan an imprinted bar code. However, the electronic bar code simulation has several advantages. The liquid crystal modulator sequentially outputs a high contrast signal approximately 100:1 whereas manually scanning an imprinted bar code produces a low contrast approximately 3:1 signal in which the pulse widths vary with scanning rate. The liquid crystal modulator produces an optical signal that is much easier to detect, and one that results in fewer detection errors. Lastly, the identification and data gathering functions are combined into a single operation in a uniform code format.

FIG. 6 shows a long range scanning system 102 for acquiring data from a plurality of encoding units 104a through 104n like the one shown in FIG. 3. The units are attached to separate valves 105a through 105n and receive data from temperature and hydrocarbon sensors 106a through 106n respectively. A laser 107 emits a readout beam 108 which passes through a beam splitter B/S polarizer 109. The polarized beam is reflected off a controllable mirror 110, and is directed on a path 111 to one of the N encoding units. The polarized beam illuminates the unit's liquid crystal and optical sensor which initiates the modulation circuit to read out the ID and data codes, and modulate the liquid crystal which in turn modulates the polarization of the readout beam.

The polarization modulated beam is reflected off the array of corner reflectors and back through the liquid crystal cell on a path 112 parallel to the incident path 111, reflects off the mirror 110, and back through the beam splitter which modulates the intensity of the readout beam in accordance with the ID and data codes. The B/S polarizer passes light modulated by ninety degrees and blocks the unmodulated light which is opposite of the polarizer used in the wand reader system. The detector can simply invert the signal to provide consistent codes, or the computer can be programmed to use inverted logic. The intensity modulated light is detected by a detector 113 which converts it to a binary logic signal 114, and transmits it to a computer 116 that validates the ID code and logs the data for that unit. The computer is programmed to scan the N encoding units at regular intervals, log the data, and analyze it to predict or detect leakage problems or failures at the valves. The computer transmits signals to mirror drive electronics 118 which controls the position of mirror 110.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims. The invention is not limited to laser light source, or even to the visible light spectrum. For example, infrared scanners could be employed.

We claim:

1. An optical data encoding and readout system for identifying an object, comprising:
   a memory for storing a unique object identification code in a multi-bit binary bar code format;
   a liquid crystal cell for receiving a polarized readout beam; and
   a control circuit for reading out the identification code stored in said memory and modulating the orientation of the liquid crystals in said cell between binary orientations in accordance with the state of each successive bit in the identification code, said liquid crystal cell in turn modulating the polarization of said readout beam with said code, a light source that projects said polarized readout beam onto said liquid crystal cell within an approximately stationary orientation with respect to said liquid crystal cell.

2. The system of claim 1, wherein the polarization modulated readout beam is transmitted through a polarizer, which modulates the readout beam's intensity in accordance with said identification code.

3. The system of claim 1, further comprising:
   a sensor for providing object related data to said memory for storage in the memory as data codes in said binary bar code format, and said control circuit reading out said stored data to modulate the liquid crystals between binary orientations in accordance with the state of each successive data code bit.

4. The system of claim 1, wherein said source is a bar code wand reader.

5. The system of claim 1, further comprising a light source that illuminates the entire liquid crystal cell with said polarized readout beam.

6. An optical data encoding system for use with a bar code wand reader to identify an object, wherein the wand reader projects a readout beam which is modulated by the system, and decodes the intensity modulated beam, comprising:
   a memory for storing a unique object identification code in a format that corresponds to a multi-bit binary bar code;
   a liquid crystal cell for receiving the readout light beam;
   a polarizer for polarizing the readout beam; and
   a control circuit for reading out the identification code stored in said memory and modulating the liquid crystals in said cell between binary orientations in accordance with the state of each successive bit in the identification code, said liquid crystal cell in turn modulating the polarization of said readout beam with said code, and said polarizer modulating the beam's intensity in accordance with the beam's modulated polarization.

7. The system of claim 6, further comprising:
   a sensor for providing object related data to said memory for storage in the memory as data codes in said binary bar code format, and said control circuit reading out said stored data to modulate the liquid crystals in accordance with the state of each successive data code bit.

8. The system of claim 6, wherein said wand reader projects a readout beam as a narrow beam that illuminates only a small portion of a front surface of said liquid crystal cell, said entire cell being modulated one bit at a time so that it can receive said narrow readout beam at different positions on its front surface and with different motions along said front surface while maintaining the modulation of said readout beam.

9. A long range data encoding and scanning system for identifying a plurality of objects, comprising:
   a directable light source having a polarizer for selectively projecting a polarized readout beam;
   a plurality of encoding units, each unit including a memory for storing a unique object identification code and object related data in a multi-bit binary bar code format, a liquid crystal cell for receiving the readout light beam, and a control circuit for reading out the identification code and the object related data stored in said memory and modulating the orientations of the liquid crystals in said cell in accordance with the state of each successive bit in the identification code and the object related data, said liquid crystal cell in turn modulating the polarization of said readout beam with said code and said data; and
   a detector for receiving and decoding the modulated readout beam to identify the selected object and download said data.

10. The long range scanner of claim 9, wherein the projected readout beam follows a first path, further comprising:

a single corner reflector positioned behind said liquid crystal cell for reflecting the polarization modulated readout beam back through said cell on a second path parallel to the first path in order to accurately return the beam to the detector.

11. The long range scanner of claim 10, further comprising:

a polarizer for polarizing the projected readout beam; and a mirror for directing the polarized readout beam on the first path to a selected one of the units, and for reflecting the modulated beam on the second path through the polarizer to the detector, and said polarizer modulating the beam's intensity in accordance with the beam's modulated polarization.

12. The system of claim 9, wherein said directable light source projects said polarized readout beam so that it illuminates the entire liquid crystal cell.

13. A method for reading out an identification code from an encoding unit that includes a memory for storing the unique object identification code in a multi-bit binary bar code format, a liquid crystal cell, and a control circuit for reading out the identification code stored in said memory and modulating the orientations of the liquid crystals, comprising:

holding a bar code wand reader up to the liquid crystal in an approximately stationary position to project a readout beam through the liquid crystal cell;

activating said control circuit so that it reads out the identification code and modulates the orientations of all of the liquid crystals in said cell in accordance with the state of each successive bit in the identification code, said liquid crystal cell in turn modulating the polarization of said readout beam with said code; and reflecting said modulated readout beam off of a reflector back through said cell and into said bar code wand reader.

14. A method for reading out a plurality of identification codes from remote encoding units that each include a memory for storing a unique object identification code in a multi-bit binary bar code format, a liquid crystal cell, and a control circuit for reading out the identification code stored in said memory and modulating the orientations of the liquid crystals, comprising:

selectively projecting a polarized readout beam to illuminate the entire liquid crystal cell in successive ones of said encoding units; and activating the control circuit associated with the illuminated cell so that the control circuit reads out the identification code and modulates the orientations of all of the liquid crystals in said illuminated cell in accordance with the state of each successive bit in the identification code, said liquid crystal cell in turn modulating the polarization of said readout beam with said code.

* * * * *